US011063897B2

(12) United States Patent
Kessler et al.

(10) Patent No.: US 11,063,897 B2
(45) Date of Patent: Jul. 13, 2021

(54) METHOD AND SYSTEM FOR ANALYZING ELECTRONIC COMMUNICATIONS AND CUSTOMER INFORMATION TO RECOGNIZE AND MITIGATE MESSAGE-BASED ATTACKS

(71) Applicant: CDW LLC, Vernon Hills, IL (US)

(72) Inventors: Joseph Kessler, Grayslake, IL (US); Andre Coetzee, Cary, IL (US); Dan Verdeyen, Glenview, IL (US); Suresh Bellam, Vernon Hills, IL (US)

(73) Assignee: CDW LLC, Vernon Hills, IL (US)

( * ) Notice: Subject to any disclaimer, the term of this patent is extended or adjusted under 35 U.S.C. 154(b) by 0 days.

(21) Appl. No.: 16/290,803

(22) Filed: Mar. 1, 2019

(65) Prior Publication Data

US 2020/0280530 A1    Sep. 3, 2020

(51) Int. Cl.
*H04L 12/58*    (2006.01)
*H04L 12/863*   (2013.01)

(52) U.S. Cl.
CPC .............. *H04L 51/30* (2013.01); *H04L 47/50* (2013.01)

(58) Field of Classification Search
None
See application file for complete search history.

(56) References Cited

U.S. PATENT DOCUMENTS

| 8,131,742 | B2 | 3/2012 | Stellhorn et al. |
| 8,607,334 | B2 | 12/2013 | Brown et al. |
| 8,752,172 | B1 | 6/2014 | Dotan et al. |

(Continued)

FOREIGN PATENT DOCUMENTS

| EP | 1877905 A2 | 1/2008 |
| WO | WO-2017/162997 A1 | 9/2017 |

(Continued)

OTHER PUBLICATIONS

Duman et al., EmailProfiler: Spearphishing filtering with header and stylometric features of emails, 2016 IEEE 40th Annual Computer Software and Applications Conference, Jun. 10-14, 2016, Atlanta, Georgia, pp. 408-416 (2016).

(Continued)

*Primary Examiner* — Natisha D Cox
(74) *Attorney, Agent, or Firm* — Marshall, Gerstein & Borun LLP

(57) ABSTRACT

A method includes receiving a message, enqueueing the message, dequeueing the message by a fraud detection service, analyzing the message using a trained machine learning model, analyzing an isolated domain name, storing the message, and causing a mitigation action. A computing system includes a transceiver, a processor, a memory storing instructions that when executed by the processor cause the system to receive a message, enqueue the message, dequeue the message, analyze the message using a machine learning model, analyze an isolated domain name, store the message, and cause a mitigation action. A non-transitory computer readable medium contains instructions that when executed, cause a computer to receive a message, enqueue the message, dequeue the message by a fraud detection service, analyze the message using a machine learning model, analyze an isolated domain name, store the message, and cause a mitigation action.

20 Claims, 5 Drawing Sheets

(56) References Cited

U.S. PATENT DOCUMENTS

| | | |
|---|---|---|
| 8,839,401 B2 | 9/2014 | Starink et al. |
| 9,009,459 B1 | 4/2015 | Nachenberg et al. |
| 9,106,694 B2 | 8/2015 | Aziz et al. |
| 9,160,766 B2 | 10/2015 | Kashyap et al. |
| 9,332,022 B1 | 5/2016 | Ashley |
| 9,501,746 B2 | 11/2016 | Prakash |
| 9,516,053 B1* | 12/2016 | Muddu .................. G06N 5/04 |
| 9,548,988 B1 | 1/2017 | Roundy et al. |
| 9,628,506 B1 | 4/2017 | Han et al. |
| 9,654,492 B2 | 5/2017 | Maylor et al. |
| 9,686,308 B1 | 6/2017 | Srivastava |
| 9,832,215 B2 | 11/2017 | Gafni et al. |
| 9,847,973 B1 | 12/2017 | Jakobsson et al. |
| 9,967,268 B1 | 5/2018 | Hewitt et al. |
| 9,971,878 B2 | 5/2018 | Nachenberg |
| 10,063,584 B1 | 8/2018 | Wescoe et al. |
| 10,412,108 B2* | 9/2019 | LaRosa ................ G06F 40/289 |
| 2004/0177271 A1* | 9/2004 | Arnold ................ G06Q 10/107 713/154 |
| 2006/0021038 A1 | 1/2006 | Brown et al. |
| 2009/0157675 A1 | 6/2009 | Stellhorn et al. |
| 2011/0314546 A1 | 12/2011 | Aziz et al. |
| 2013/0333026 A1 | 12/2013 | Starink et al. |
| 2014/0380478 A1 | 12/2014 | Canning et al. |
| 2015/0264084 A1 | 9/2015 | Kashyap et al. |
| 2016/0014151 A1* | 1/2016 | Prakash .............. H04L 63/1483 726/22 |
| 2016/0021142 A1 | 1/2016 | Gafni et al. |
| 2016/0063218 A1 | 3/2016 | Nachenberg |
| 2016/0094566 A1 | 3/2016 | Parekh |
| 2016/0164892 A1 | 6/2016 | Satish et al. |
| 2016/0180022 A1* | 6/2016 | Paixao .................. G16H 10/60 705/3 |
| 2016/0191548 A1* | 6/2016 | Smith .................. G06F 21/565 726/23 |
| 2017/0195293 A1 | 7/2017 | Dahan et al. |
| 2017/0230323 A1* | 8/2017 | Jakobsson ........... H04L 63/1433 |
| 2017/0251006 A1* | 8/2017 | LaRosa ............... H04L 63/1441 |
| 2017/0257395 A1 | 9/2017 | Goutal |
| 2017/0272464 A1 | 9/2017 | Goutal |
| 2018/0152471 A1 | 5/2018 | Jakobsson |
| 2018/0359280 A1 | 12/2018 | Elworthy |
| 2020/0067861 A1* | 2/2020 | Leddy .................... H04L 51/12 |

FOREIGN PATENT DOCUMENTS

| | | |
|---|---|---|
| WO | WO-2018/032041 A1 | 2/2018 |
| WO | WO-2018/164701 A1 | 9/2018 |

OTHER PUBLICATIONS

Stringhini et al., That ain't you: Blocking spearphishing through behavioral modelling, 20 pp., In: Almgren et al. (eds.), Detection of Intrusions and Malware, and Vulnerability Assessment. DIMVA 2015. Lecture Notes in Computer Science, vol. 9148. Springer, Cham, first online Jun. 23, 2015.

International Application No. PCT/US2020/019654, International Search Report and Written Opinion, dated Apr. 17, 2020.

* cited by examiner

METHOD AND SYSTEM FOR ANALYZING ELECTRONIC COMMUNICATIONS AND CUSTOMER INFORMATION TO RECOGNIZE AND MITIGATE MESSAGE-BASED ATTACKS

FIELD OF THE DISCLOSURE

The present invention generally relates to facilitating the identification and mitigation of fraud, and more specifically, to identifying and classifying fraudulent electronic communications based on one or more trained machine learning (ML) models.

BACKGROUND

A modern company may receive many emails per day (e.g., millions or more) from external senders. A high percentage of the emails (e.g., 95% of emails) may be identified as junk mail. The remaining percentage may include many (e.g., hundreds of thousands) of emails, far too many for even a devoted and well-staffed workforce to manually review. However, the remaining non-junk email may include one or more valuable orders relating to the company's products for sale. For example, the company may receive thousands or more individual orders per day, each of which may include a large number (e.g., tens or hundreds) of individual product purchases. So on one hand, the large volume of email inbound to the organization presents a challenge in that the potential for fraud and abuse is high. On the other hand, organization finds it increasingly difficult to separate and handle legitimate messages.

A message-based attack may include or be based on a social engineering attack, such as an impersonation attack, wherein an attacker attempts to disguise the attacker's identity and/or to assume the identity of another person or entity. Such attacks may include registering false domain names and targeting individual employees of a company to gain information and/or to cause the individual employees to take certain actions (e.g., to divulge information, to make changes to company computer systems, etc.). For example, an attacker may send a message to a general company inbox (e.g., via an email, an electronic form, a text message, etc.) expecting that someone at the company will receive the message and act on the message due to goodwill and/or the desire to provide customer service. In some cases, attackers may seek to impersonate law enforcement or other figures of authority. Other attack types may include order modification attacks, wherein an initial order is placed for a small quantity of goods (e.g., an order for two iPads), only to be enlarged by a later order modification message (e.g., an order for 50 iPads). Order modification attacks may also include modifying the ship-to address of an existing account to a "dead drop" shipping address.

Existing methods for determining whether electronic communications include impersonation, phishing, spear phishing, etc., attacks have been developed, but these methods rely on rigid, inflexible approaches (e.g., pattern matching based on past attacks). Such methods require programmers to identify fraudulent patterns a priori, and as such, are not effective in stopping evolving security threats. Further, the patterns developed in the current state of the art suffer from a high rate of false positives such that they do not meaningfully limit the number of suspect messages, and do not attempt to understand the semantic content of messages. Furthermore, the current state of the art treats emails from all domains as equal, and lacks any mechanisms for mitigating attacks in real-time.

BRIEF SUMMARY

In one aspect, a method of detecting and mitigating message-based attacks includes receiving, via a computer network, an electronic message, enqueueing the message in a message queue, dequeueing the message by a fraud detection service, analyzing the message using a machine learning model trained by analyzing a partitioned data set of fraudulent and non-fraudulent messages to determine an intent; analyzing a domain name isolated from the message to determine a domain name trust output; storing, when the intent corresponds to an order and the domain name trust output is untrusted, the message in a results store; and causing one or more mitigation actions to occur by analyzing the message using one or more mitigation rules.

In another aspect, a computing system for detecting and mitigating message-based attacks including a transceiver; one or more processors; and one or more memories storing instructions is provided. When the instructions are executed by the one or more processors, the instructions cause the computing system to: receive, via the transceiver, an electronic message; enqueue the message in a message queue; dequeue the message by a fraud detection service; analyze the message using a machine learning model trained by analyzing a partitioned data set of fraudulent and non-fraudulent messages to determine an intent; analyze a domain name isolated from the message to determine a domain name trust output; store, when the intent corresponds to an order and the domain name trust output is untrusted, the message in a results store; and cause one or more mitigation actions to occur by analyzing the message using one or more mitigation rules.

In yet another aspect, a non-transitory computer readable medium containing program instructions is provided. When the instructions are executed, the instructions cause a computer to receive, via a computer network, an electronic message; enqueue the message in a message queue; dequeue the message by a fraud detection service; analyze the message using a machine learning model trained by analyzing a partitioned data set of fraudulent and non-fraudulent messages to determine an intent; analyze a domain name isolated from the message to determine a domain name trust output; store, when the intent corresponds to an order and the domain name trust output is untrusted, the message in a results store; and cause one or more mitigation actions to occur by analyzing the message using one or more mitigation rules.

DETAILED DESCRIPTION

Overview

The embodiments described herein relate to, inter alia, methods and systems for analyzing electronic communications and customer information to recognize and mitigate fraudulent message-based attacks. More particularly, in some embodiments, an email listener may filter electronic messages to identify messages from external senders. Messages may be enqueued into a message queue and dequeued by a fraud detection service. Messages may be analyzed by one or more machine learning models and one or more domain validation modules to return, respectively, intent and validity indicators.

Herein, "intent" refers to the semantic purpose of a message. For example, a sender may draft a message seeking to obtain a quotation in regards to one or more product sold by the company. In another case, a sender may draft a message to obtain information relating to a particular product (e.g., to obtain confirmation of a part number, a price, an applicable tax, etc.). The sender's intent may be determined by analyzing the sender's message(s) using one or more trained machine learning models.

Example Environment for Recognition and Mitigation of Message-Based Attacks

Figure 1:
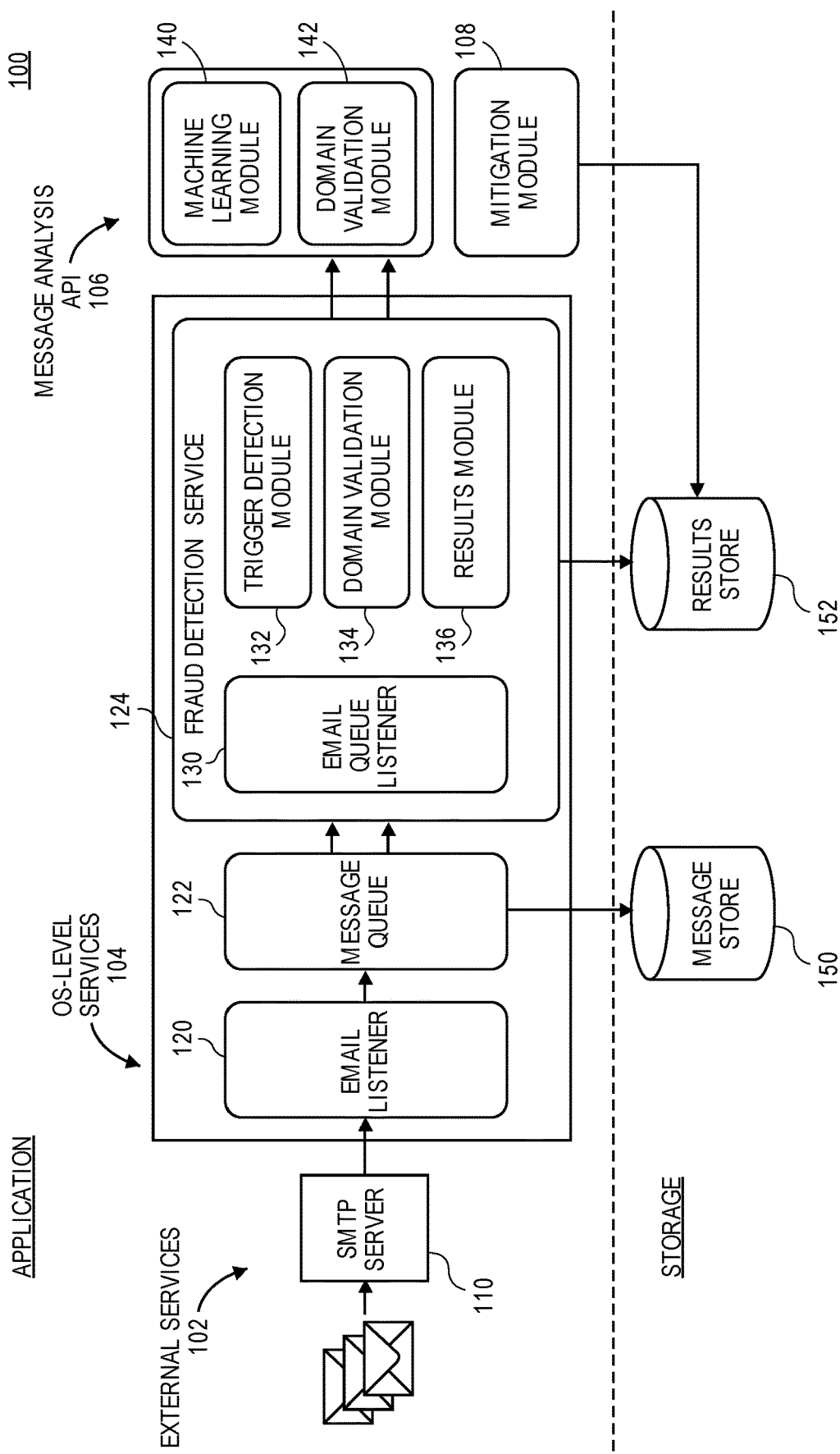
FIG. 1 depicts an example environment for using machine learning to detect message-based attacks.
Figure 4:
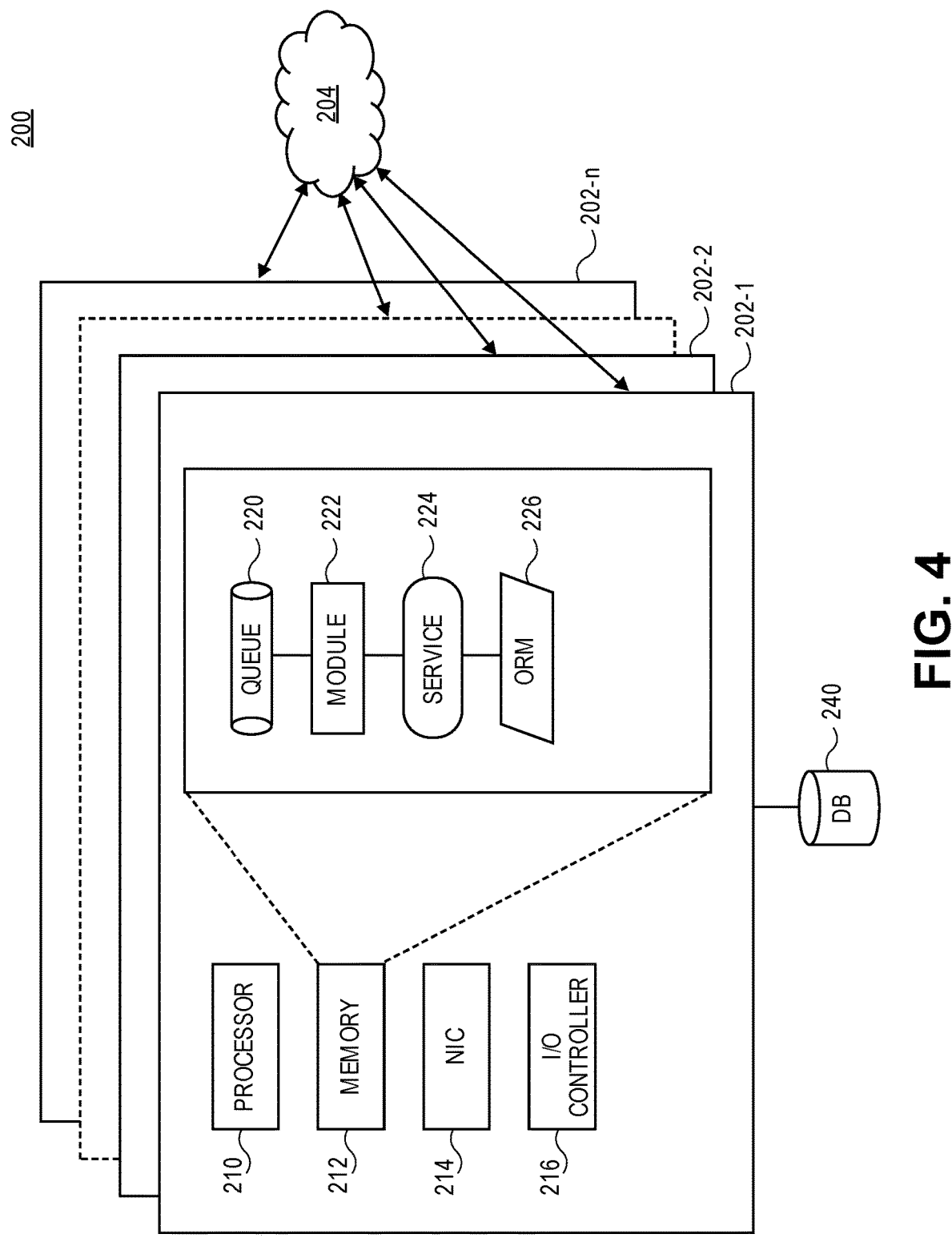
FIG. 4 depicts an example computing environment for implementing the environment of FIG. 1, according to an embodiment an scenario.

Turning to FIG. 1, an example environment 100 for recognizing and mitigating message-based attacks includes an application layer and a storage layer. The application layer includes one or more external services 102, one or more operating system (OS)-level services 104, a message analysis application programming interface (API) 106, and a mitigation engine 108. The environment 100 may be implemented using one or more networked computers as depicted in FIG. 4.

The external services 102 may include one or more Simple Mail Transfer Protocol (SMTP) servers 110 for receiving delivery of email messages. Other service handlers may be included, such as Short Message Service (SMS) messaging services, chat services, etc. The external services receive messages (e.g., email) from the Internet and intranet domains of the company, and deliver messages to other components such as the OS-level services 104. Herein, "messages" may include any suitable message types such as emails, SMS messages, electronic form submissions (e.g., GET/POST requests), etc.

The external services 102 may include one or more filters for removing internal-internal emails (e.g., emails sent by employees to services, legal, security within the company). The one or more filters may be based on organizational structure (e.g., department) and the level of the sender. The one or more filters drastically and advantageously reduce the amount of hardware needed to operate the external services 102, the OS-level services 104, and the message analysis API 106. For example, the company may establish a set of domain names that are considered internal domains (e.g., example.com, example-canada.com, example.co.uk, etc.). A company email filter may remove (or retain) any emails from domains other than internal domains. In another example, the company may filter and/or group emails based on the sender/recipient being internal-internal (e.g., from one employee to another), internal-external (e.g., outbound email), or external-internal (e.g., inbound from customers to the company). In yet another example, one of the filters may filter junk mail. The filters may be stacked into a "waterfall" design, so that the external services 102 first filters the messages to remove junk, then to retain external-internal, and so on.

In an embodiment, the OS-level services 104 include an email listener 120, a message queue 122, and a fraud detection service 124. The email listener 120 listens for mail deliveries from the external services 102, and applies one or more filters to each message. The email listener delivers mail from external senders to the message queue 122. In embodiments using other message types, additional listeners may be implemented that listen for delivery of other message types. The filters may result in a message being discarded, delivered, modified, bounced, and/or forwarded. For example, a single message may be saved to a database, delivered to a local user, and delivered to a remote server. In some embodiments the email listener 120 may be implemented in the SMTP servers 112 (e.g., as a Sieve rule set). In some embodiments, the email listener may deliver messages to the message queue 122.

The message queue 122 may accept and forward messages. The message queue 122 may include one or more queues. For example, one queue may be created for a first set of account managers, a second queue may be created for a second set of account managers, etc. The queues may be named and accessed simultaneously (e.g., both written to and read from in parallel). One of the primary benefits of using the message queue 122 for message delivery and processing is that the message queue 122 allows message to be processed asynchronously. That is, the processing of messages does not block the execution of the mail server threads/processes, and vice versa. Furthermore, because the message queue 122 may be implemented in a separate process space, the message queue 122 may be scaled by implementing the message queue 122 using one or more additional dedicated servers (e.g., dedicated hardware servers and/or virtual machines). In some embodiments, the message queue 122 may store messages to an electronic database (e.g., the message store 150). In further embodiments, the message queue 122 may be implemented using a suitable message queueing system/protocol, such as Advanced Message Queueing Protocol (AQMP), RabbitMQ, etc. The message queue 122 may be persistent such that messages remain in the one or more queues across reboots. The message queue 122 may be accessed by other components for dequeueing of messages, such as by the fraud detection service 124.

Generally, the fraud detection service 124 retrieves emails from the message queue 122 and applies ML to determine the intent of the message. When the email is not of interest, it may be discarded and/or logged. The fraud detection service 124 calls the message analysis API 106, passing the email message as a parameter to the ML module 140 and/or the domain validation module 142. The ML module 140 analyzes the email message and returns an indication of the intent of the sender, via the message analysis API 106. Depending on the intent (e.g., Order), the fraud detection service 124 calls the message analysis API 106, passing the email as a parameter to the domain validation module 142. The domain validation module 142 isolates the sender address and analyzes the address. The machine learning module 140 may return a Boolean result, or a probability/best guess. If a probability is returned, a cut-off value determined during training (e.g., 35%) may be used to simulate a Boolean result while minimizing false positives and false negatives The fraud detection service 124 includes an email queue listener 130, a trigger detection module 132, a domain validation module 134, and a results module 136.

The email queue listener 130 dequeues messages from the message queue 122. One or more email queue listener 130 may be implemented using multiple servers, in some cases, and the email queue listener 130 may include instructions for automatically dequeueing messages as they are enqueued into the message queue 122, or periodically (e.g., every 30 milliseconds, every second, every minute, etc.). The email queue listener 130 may include a thread-based timer and/or may be executed using a scheduler (e.g., a cron job). The fraud detection service 124 includes modules for recognizing attacks and/or fraud. For example, the fraud detection service 124 may include a trigger detection module 132 that calls the message analysis API 106, providing a message received/retrieved from the email queue listener 130 as a parameter.

The trigger detection module 132 may pass the message as an HTTP request (e.g., a POST request) including the message as a first parameter to the API 104, wherein the request includes one or more additional parameters specifying one or more trained ML model(s) with which to analyze the message. The API 104 may return a mapping of models to results, which may be stored in the results store 152 by the results module 136. For example, the API 104 may return a mapping of {'model1': '0.13', 'model2':0.8}, indicating that two ML models analyzed the message to generate two respective scores. As discussed further below, the scores may be indicative of a particular intent (e.g., a respective probability that the message is an order, a request for a quote, a question about a part number, etc.). Other modules within the OS-level services 104 may simultaneously send HTTP requests to the API 104, which the API 104 may process in parallel.

For example, the domain validation module 134 may send a second HTTP request (e.g., GET or POST) specifying the message as a first parameter and one or more additional parameters relating to the domain validation module 142. The fraud detection service 124 may operate the domain validation module 134 at or around the same time that the above HTTP request is sent by the trigger detection module 132 to the message analysis API 106. The additional parameters may specify whether to perform a WHOIS search using a cached result, a free third-party WHOIS service, or a paid a third-party WHOIS service. The API 104 may return a second response to the domain validation module 134 including the result of analyzing the message.

In some embodiments, the trigger detection module 132 and domain validation module 134 may be operated simultaneously via a single HTTP request and response. There, the requests may be encoded as a list or hash, and received as a list or hash, so that processing code can readily distinguish between the result of the ML analysis and the result of the domain analysis provided, respectively, by the ML module 140 and the domain validation module 142. Combining the requests may advantageously reduce network overhead, and may require synchronization of the trigger detection module 132 and the domain validation module 134.

The results module 136 may store the output of the trigger detection module 132 and/or the domain validation module 134 in a database (e.g., the results store 152) and/or process the output further, as discussed below. In some cases, the fraud detection service 124 may analyze the message using only the trained ML models via the ML module 140, or using only the domain information of the message via the domain validation module 142. In some embodiments, the domain analysis may be dependent on the outcome of the ML model analysis, or vice-versa. In yet further embodiments, the stored result of the ML model analysis and/or the domain analysis may be analyzed by a separate component, as discussed further below. For example, the mitigation engine 108 may retrieve/receive the results of the analysis from the results store 152 and take one or more actions based on the results.

Example Message Analysis API

Figure 2:
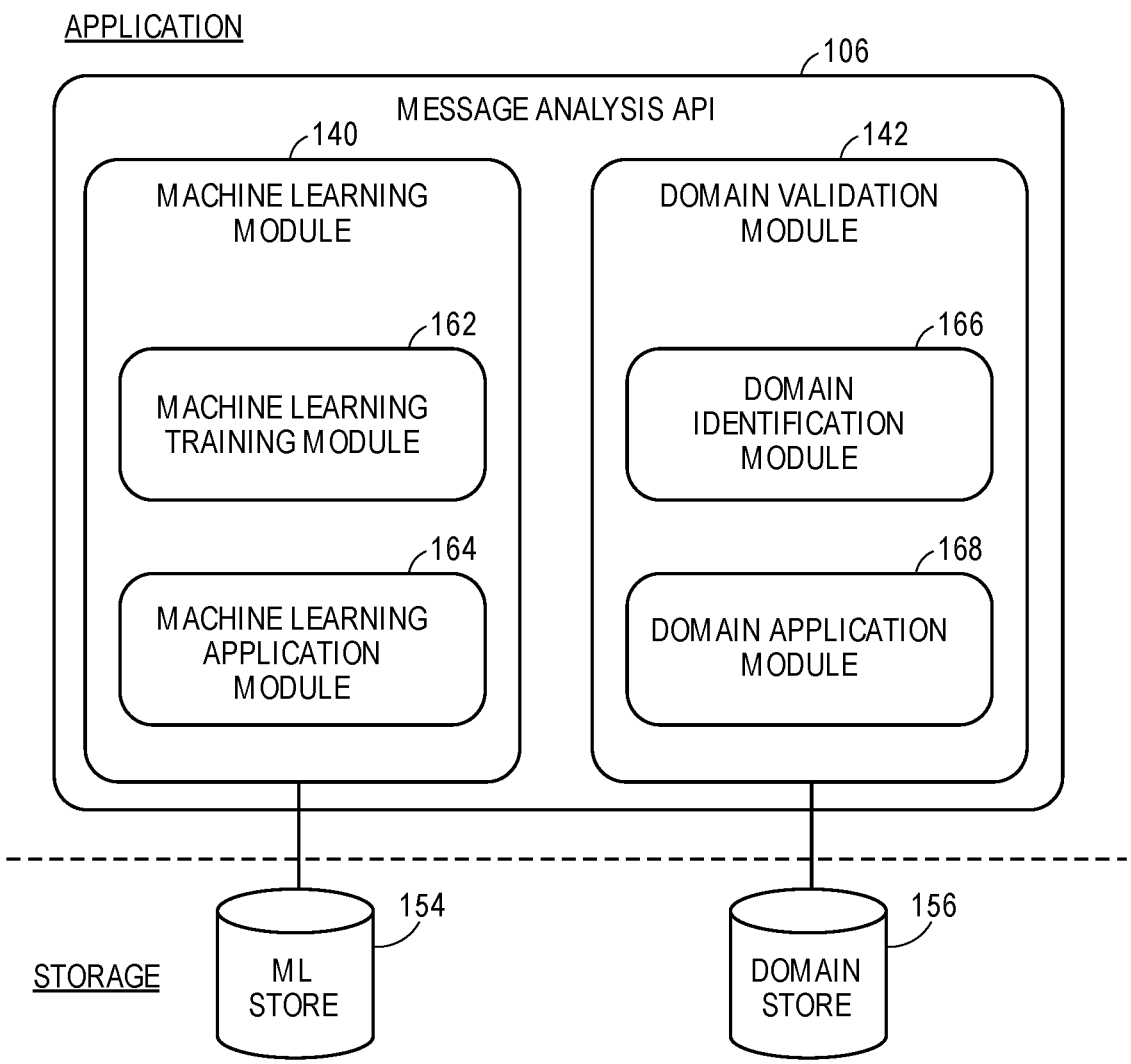
FIG. 2 depicts a detail of the message analysis application programming interface of FIG. 1, according to an embodiment.

Turning to FIG. 2, a detail of the message analysis API 106 is depicted. The message analysis API 106 includes the ML module 140 of FIG. 1 and the domain validation module 142 of FIG. 1. The ML module 140 includes an ML training module 162 and an ML application module 164. The domain validation module includes a domain identification module 166 and a domain application module 168. The detail of the message analysis API 106 includes an ML store 154 and a domain store 156, which may be implemented as electronic databases.

Example ML Model Training and Operation

The ML training module 162 trains ML models. The ML training module 162 may learn to decipher text written in many ways and for many topics, without explicit coding. For example, the training module 162 may train an Order model to analyze a message to determine whether the message is an order request. Training the ML model(s) may include curating a training message data set of many (e.g., thousands) of messages to use as examples. The ML training module 162 may retrieve the training data set from the ML store 154. In the context of the techniques disclosed herein, the training process may be performed a priori in some embodiments. For example, the ML training module 162 may train an ML model "offline," before the techniques are used to analyze messages or other input at runtime.

The messages may be curated automatically or manually. For example, in an embodiment, the training messages are identified by partitioning all email messages received by one or more account manager (AM) into a respective matched/ unmatched data set. Continuing the above Order example, the partitioning may be performed by the ML training module 162 determining whether a particular message to an AM resulted in a non-fraudulent order or not. The ML training module 162 may determine whether an order resulted from a particular message by cross-referencing email messages stored in a database with order information stored in multiple databases. For example, messages stored in the message store 150 and/or the results store 152 may be cross-referenced (e.g., via an SQL JOIN query) with orders in an orders database. The following is an example of training data partitioned into an Order-Matched data set: 191027631538221 Mon, 15 Oct. 2018 16:09:42 +0000 1539619782 aaron@example-gaming.com accountmgr123@example.com Zebra kr403 Hi Bo, Could you send us a price quote for 3 of these Zebra printers and the power supplies ? Thanks 3 Power supplies (KR403) https:// www.cdw.com/product/zebra-kr203-kr403-part-kit-pwr-sup/5292645 3 Zebra KR403 printers https://www.cdw.com/ product/Zebra-KR403-receipt-printer-monochrome-direct-thermal/2231697

The following is an example of training data partitioned into an Order-Unmatched data set:

support@example-customer.com user@example-customer.com RE: FW: Privacy Screen Shipment "Hi Team, The remaining 2 filters have shipped via UPS: 1z36883w1305555812—please allow for shipping details to update after 6 pm CST. Thanks, Lee Smith Example Customer Sales Support -----"

Once the messages are partitioned, a grid search may be used to explore different ML models to determine which is most capable of correctly predicting classifying new messages, based on the training. The grid search may be used to determine which models work best and many iterations may be performed, along with adjustment of the models and data (i.e., feature engineering) to arrive at a suitable model. An example of feature engineering is filtering messages that correspond to personal orders placed by AMs using their work email addresses. For example, an AM may order goods (e.g., flowers or shoes) from an online retailer using an email address of the company for correspondence with the retailer. A message from the retailer may be a non-junk email, and an external-internal email thereby making it past the filters at the external services 102 and the OS-level services 104. The ML module 140 may analyze the message and determine that the message is an order. By using feature engineering, the Order module can be trained to correctly classify such messages as non-matches, when the company is only interested in Order-related messages that originate from external customers. In some cases, the company can achieve similar results using additional filtering.

In some embodiments, the company may enable additional feature engineering in the ML training module 162. For example, the ML training module 162 may include a message parsing module (not depicted) that manipulates the content of messages. For example, in an email context, the message parsing module may strip email signatures, confidentiality notices, and/or salutations from message bodies. The ML training module 162 may include a module for retesting the model with such feature engineering in place, to measure improvements in accuracy.

The training process may include normalizing the messages using a text normalization procedure. The text normalization procedure may include sanitizing the message body (e.g., removing HTML). The procedure may also include tokenizing the message body, lemmatizing the email body, and/or removing/lowercasing stop words. The ML training module 162 may further remove datetimes, timestamps, and record IDs from the training data set. Then, a percentage of the records (e.g., 30%) may be removed from the training sets for validation sets.

The ML training module 162 may perform the grid search, and analyze several techniques, with parameterized ranges, to determine which model(s) best fit the training data. The ML training module 162 may perform a cross validation step to confirm the results of the grid search. Empirical testing suggests that for Order messages, the following model and associated parameters result in the highest-performing precision score:
tfidf=TfidfVectorizer(analyzer='word', binary=False, lowercase=True, stop_words='english', min_df=3, max_df=0.8, ngram_range=(1,2))
model_pipeline=make_pipeline(TextNormalizer( ), tfidf, LogisticRegression(C=50, class_weight='balanced'))

After the ML training module 162 trains the model, a holdout set may be used to make predictions and analyze the number of false positives and false negatives. By iteratively testing the holdout set, an optimal threshold probability can be determined, wherein the number of false positives and false negatives are minimized. In empirical testing, models have been trained to identify messages as Orders with accuracy of greater than 94%. Several advantages are realized by training ML models that are able to repeatedly classify messages with high accuracy. First, the computing resources of the company are more effectively utilized. Without the present techniques, the company is required to store all messages until such time that a human reviewer can analyze the messages, resulting in high disk drive storage demands. Second, required processing resources are vastly decreased. For example, in email message embodiments wherein domain validation is dependent on the output of the ML module 140, rather than processing every email from an external source that is non-junk email, the domain validation module 142 need only analyze domains of those emails that are already identified as of interest (e.g., emails that are classified as Orders) by the machine learning module 140. The related costs to the company for using a third-party domain validation service to validate the domains are thereby decreased commensurate with the decrease in the processing resources required. Third, rather than spending time classifying thousands of messages, human users can focus on effectively handling messages that are already classified. Other benefits are envisioned.

It should be appreciated that the ML training module 162 may train many (e.g., thousands or more) ML models. Each ML model may be serialized and stored in an electronic database, such as ML store 154. Each ML model may be given a name and a description, and may be referenced by the name and/or description. For example, an ML model may be named "Order Identification." Another model may be named "Quote Identification." In some embodiments, models may be trained to perform different functions, such as identifying requests for tracking numbers. Fraud detection service 130 may include, or be wrapped within, a dispatch layer (not depicted) that alters the control flow of the OS-level services 104 based on different intents. For example, in the case of a tracking number request, the dispatch layer may cause control to execute a tracking number module, wherein a response is sent to the sender including tracking information based on information contained within the sender's message. Multiple versions of a given model types (e.g., Order, Quote, Tracking, etc.) may be trained, serialized, and tested.

Once the one or more models are trained and stored in the ML store 154, the ML application module 164 may load and/or operate each trained ML model. For example, the ML application module may retrieve the Order Identification model, apply a message to the model, and display/transmit the output of the model to another component (e.g., to the fraud detection service 124). As discussed above, the message analysis API 106 may receive/retrieve HTTP requests from the fraud detection service 124, and the message analysis API 106 may format such requests and call the ML application module 164, passing parameters (e.g., the message) to the ML application module 164. Similarly, the ML application module 164 may output its result to the message analysis API, which may wrap the output in an HTTP response object, and return the HTTP response object to the fraud detection service 124. Multiple instances of the ML application module 164 may be operated at once, using multiple processes and/or multiple computing hardware, such that the message analysis API may analyze multiple messages in parallel (i.e., handle multiple API calls from external clients simultaneously). Further, a single trained ML model may be operated in parallel by the multiple ML application module 164 instances.

The trained model may be loaded and used to predict the likelihood that a message belongs to a particular message type (e.g., the likelihood that the message is an Order):
Predictor.predict_order_intent("Hi Dave, can you order a pizza?") 0.14676906205130918
Predictor.predict_order_intent("Hi Dave, can you send me the following? MacBook Pro, USB Adapter, Charging Station") 0.9690485924970932

Example Domain Validation

The domain identification module 166 identifies domains as either valid or invalid domains. The domain identification module 166 may include instructions for analyzing messages to extract email headers and to determine email sending characteristics. The domain identification module 166 may include an algorithm for determining the true sender of a message given multiple possible headers. For example, the domain identification module 166 may extract a "From" header, a "Sender-ID" header, an envelope sender address, etc. Each of the extracted headers/fields may be a possible sender, and each may differ. The algorithm may include selecting the headers in preferential order. For example, the SMTP server 110 may enforce Sender Policy Framework (SPF) that attempt to prevent sender address forgery. Messages with passing SPF authentication may include extra header information that the domain identification module 166 may prefer over mere unsigned headers. For example, an enveloped From header having an Received-SPF: pass header may be preferred over any other sender information in the email message.

Once the domain identification module 166 determines a sender address, the domain identification module may isolate the sending domain. For example, if the sending email is user@example.com, then the domain identification module 166 may isolate "example.com." The domain identification module 166 may then query an external API (e.g., public WHOIS or a private database, such as a WHOIS service provided by DomainTools LLC) to obtain characteristics regarding the isolated domain. In particular, the domain identification module 166 may seek to obtain characteristics about the isolated domain, such as the age of the domain (i.e., the Registrar Creation Date of the domain). The age of the domain may be used as a first input to the domain application module 168. The domain validation module may provide a second input to the domain application module 168, specifically, a known value, representing whether the extracted domain is known to the company. The domain identification module 166 may determine the known value by reference to a database of known customer domains (e.g., the domain store 156) that is populated with domains that are considered "safe" by the company. Specifically, once the domain identification module 166 has isolated the domain, the domain identification module 166 may query the domain store 156 to determine whether a row exists matching the isolated domain. In some embodiments, the match may be partial (e.g., a domain including, starting with, or ending with the isolated domain may constitute a match).

The domain application module 168 includes rules for returning a domain validation result. For example, as discussed above, the domain application module 168 may accept both a domain age and a known value. In an embodiment, a rule may specify that a domain that is either known, older than one year, or both results in a TRUST output; any other combination of known value and age results in an UNTRUST output. In some embodiments, the rules of domain application module 168 include analyzing additional information pertaining to the registration of the domain, including without limitation the following fields: Registry Domain ID, Registrar URL, Updated Date, Registry Expiry Date, Registrar, Domain Status, Registrant Name, Registrant Organization, Registrant Street, Registrant City, Registrant State/Province, Registrant Postal Code, Registrant Country, Registrant Phone, Registrant Fax, and/or Registrant Email.

Further, the domain application module 168 may calculate a weighted score. Continuing the above example, the rule may instead specify that age of more than one year provides 0.1 validity score, a known value provides a 0.5 validity score, any registration at a generic top-level domain registrar causes a −0.3 validity score, for a net validity of 0.3. The domain application module 168 may be programmed to require a net score of 0.25 or higher, resulting in a TRUST output. A lower value could result in an UNTRUST or NEUTRAL output. Other rule schemes are envisioned, including an embodiment in which each known value is an independent score, based on a reputation score of the company associated with the isolated domain. For example, a partner company that the company has done business with for over a decade may have a high reputation score, whereas a partner company with no established business relationship may be assigned a more neutral score.

In some embodiments, the domain validation module 142 may include an additional module (not depicted) for identifying lookalike domains. Specifically, the domain identification module 166 may issue a fuzzy search of existing known domains to determine the similarity, or "distance," of the isolated domain to other domains. If the distance is less than a threshold amount, then the domain application module 168 may store a lookalike indication in the domain store 156, and/or mark the isolated domain as invalid. Or, in embodiments wherein the domain identification module 166 is configured to generate scores, a highly negative score (lookalike penalty) may be applied.

In some embodiments, any isolated domain having a Levenshtein Distance of two or less as compared to any known domain, may be considered a lookalike domain. For example, the Levenshtein distance of Grainger.com and Grianger.com equals 2. Therefore, when the domain identification module 166 computes the distance of the isolated domain (Grianger.com) to the known domains, and sees that Grainger.com has a score of 2, the lookalike penalty (or outright invalidity conclusion, depending on embodiment) would be applied by the domain identification module 166 to the isolated domain. Of course, other similarity metrics for string distance, or more elaborate comparison algorithms may be used, alone and/or in conjunction with the domain validation techniques described above.

Once the domain validation module 142 has isolated the sender address and generated a validity output, the message analysis API 106 may return the validity output to the calling component (e.g., the fraud detection service 124). The validity output may be returned as an independent HTTP response, or coupled to the output of another component, such as the machine learning module 140. As discussed above, the output of the fraud detection service 124 may be written to the results store 152. The end result of the above-described processing is a database (e.g., results store 152) including messages that are associated with an intent (e.g., Order) which include potentially fraudulent domain references. These messages may be further analyzed, for example, by the mitigation engine 108.

Example Mitigation

Figure 3:
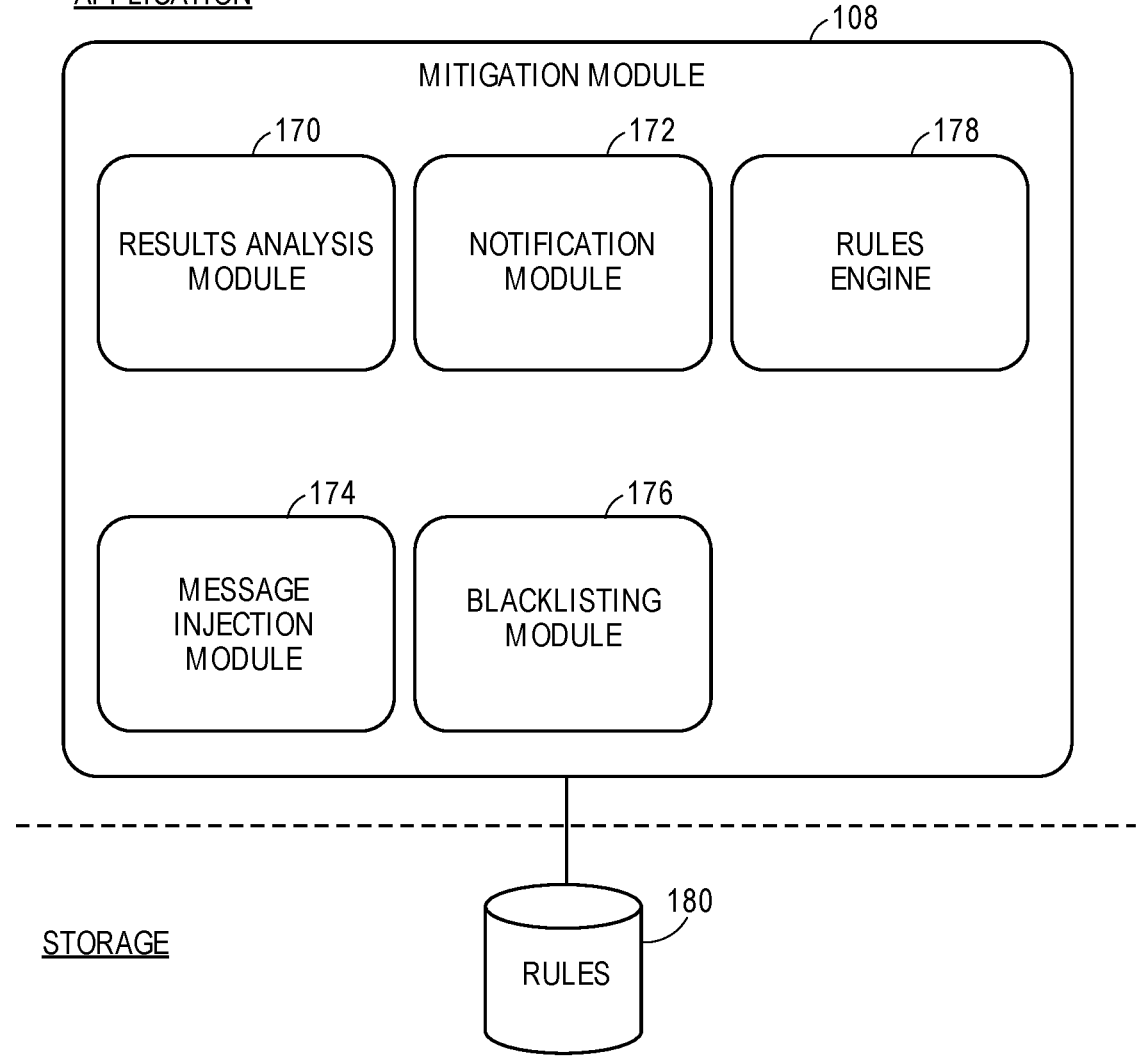
FIG. 3 depicts a detail of the mitigation engine of FIG. 1, according to an embodiment.

Turning to FIG. 3, a detail of the mitigation engine 108 is depicted. The mitigation engine 108 includes a results analysis module 170, a notifications module 172, a message injection module 174, a blacklisting module 174, a rules engine 178, and a rules database 180.

The results analysis module 170 may retrieve/receive a set of results from the fraud detection service 124. In some embodiments, the results analysis module 170 may query the results store 152 periodically. In some embodiments, the mitigation engine 108 may be configured inline with the fraud detection service 124, such that results are passed directly (e.g., via inter-process communication) from the fraud detection service 124 to the results analysis module 170. Such a configuration advantageously minimize any latencies in processing, which may prove necessary for embodiments including real-time processing of messages. The results analysis module 170 may sort, rank, and/or aggregate the set of results. For example, the results analysis module 170 may group the set of results by sender email address, to determine whether a particular sending email address (or isolated domain) is responsible for sending many potentially fraudulent emails. The results analysis module 170 may generate textual and/or graphical reports including the sorted, ranked and/or aggregated set of results.

The mitigation engine 108 may be configured to perform multiple mitigation actions based on the ranked and sorted set of results, wherein the actions are parameterized based on the type of action to be performed. In some embodiments, the results analysis module 170 includes instructions for parsing each result in the set of results to extract information that may be indicative of various types of known fraud schemes, and for taking actions when certain conditions are met (e.g., one or more rules stored in the rules database 180). Rule types include, without limitation, "NOTIFY," "INJECT," and "BLACKLIST."

The notifications module 172 includes functionality for sending notifications via a number of communication channels. The channels include, without limitation, email, text message, telephone, instant messaging, web chat, pager, etc. The notifications module 172 may be accessible by a NOTIFY rule (e.g., calling a NOTIFY function may cause notifications to be sent according to the various communication channels).

The message injection module 174 includes functionality for modifying messages. For example, the message injection module 174 may include instructions for modifying an email message to include a highlighted warning such as "WARNING: POTENTIAL FRAUD. PROCEED WITH CAUTION." The warning message may be injected into the HTML of an email message, for example, and may include color (e.g., red, or yellow) to visually indicate to the recipient of the email message that the message is potentially fraudulent. The message injection module 174 may be accessible by an INJECT rule (e.g., calling an INJECT function with a phrase parameter may insert that phrase into the message).

In some embodiments, the message injection module 174 injects messages that are already delivered to a user. For example, in an embodiment, messages may be dequeued from the message queue 122 in duplicate. There, the email queue listener 130 may dequeue a first copy of an email message, and another service (e.g., an SMTP forwarder) may dequeue and deliver a second copy to the fraud detection service 124, which ultimately delivers the message to the results store 152. When the mitigation engine then analyzes the copy in the results store 152, and determines that an indication of fraud is found, the mitigation engine 108 may access the mailbox of the recipient and mitigate the delivery of the suspected fraudulent message by 1) deleting the message, 2) quarantining the message, 3) injecting the message (e.g., using the message injection module 174), 4) sending a notification regarding the message via the notifications module 172 (e.g., a second message corresponding to the first message), 5) blacklisting information contained in the message (e.g., using the blacklisting module 176), 6) forwarding the message to a security review inbox, etc. Additional modules may be added to the mitigation module 108, such as an account suspension module (not depicted), that suspends an account associated with the isolated address until the account is reactivated by a member of the fraud team.

The blacklisting module 176 includes functionality for blocking outbound communication from the company. For example, the blacklisting module 176 may receive messages from the results analysis module 170, and parse any identifying information in the message (e.g., email, telephone number, postal address, etc.) and associate the parsed information with a type. For example, a telephone number of (555) 867-5309 may appear in a fraudulent message in the result set retrieved from the results store 152. The blacklisting module 176 may insert the phone number into a Phone column of a Blacklisted table in a mitigation database (not depicted). The blacklisting module 176 may similarly store any postal address, email address, etc. extracted from the message in respective tables. The company may then cross-reference the Blacklist table before allowing any calls to be placed, emails to be sent, or packages to be shipped. In this way, the blacklisting module 176 advantageously prevents the company from falling prey to fraudulent schemes. The blacklisting module 176 may be accessible by a BLACKLIST rule (e.g., calling a BLACKLIST function may blacklist a message).

The rules engine 178 may load and execute rules stored in the rules database 180. The results analysis module 170 may pass a hash table of extracted values to the rules engine 178, wherein the rules engine 178 creates local variables (e.g., $DOLLARVALUE) that are accessible to the rules. Other local variables that the rules engine 178 may create based on information extracted from the message by the results analysis module 170 include, without limitation, whether the message is from a known sender, (e.g., $KNOWNVALUE), age of the domain in days (e.g., $REGISTRARAGE), number of previous orders (e.g., $ORDERCOUNT), etc.

The rules engine 178 may execute all or some of the rules with respect to each message in the set of messages. For example, the rules database 180 may include rulesets specifying particular actions to take when certain conditions are met:

IF $DOLLARVALUE > 10000 AND $REGISTRARAGE < 2 THEN
   NOTIFY ("email", message, "high dollar value, new domain: potential fraud", am123@example.com)
   INJECT (message, "high dollar value, new domain: potential fraud")
   BLACKLIST (message)
END IF The ruleset may be implemented using a scripting language, allowing a great degree of flexibility in the rules and predicates.

In operation, the mitigation engine 108 receives/retrieves messages (e.g., via an SQL query) from the results store 152. The results analysis module 170 loops through the set of messages, extracting information from the headers and body of the message, and optionally, ranking, sorting, and/or aggregating the set of messages based on the extracted information.

As noted, sorting by dollar value or other sensitive criteria may be highly desirable. For example, in a lookalike domain impersonation attack, an attacker Carol may perform social engineering to determine that a company-external contact, Alice, is an employee of a customer for which Bob is the AM. Carol guesses, correctly, that the account is significant and that Alice and Bob do a lot of business together. Carol creates a new domain that is similar to the particular customer's domain, and copies Alice's signature line into an email to Bob. From Bob's perspective, the email from Carol appears to be from Alice, and Bob is caught off guard. Due to the history between Alice and Bob, Bob thinks nothing of Carol's next email, which instructs Bob to ship 50 tablet computers to an address in Florida. Bob complies and the fraud is committed. Therefore, the results analysis module 170 may sort/rank/aggregated the set of results according to criteria determined to be generally indicative of past fraudulent activity. Such rankings, in addition to the intent detection and domain validation done previously, result in highly relevant information to those tasked with fraud review.

The results analysis module 170 may then pass the extracted information to the rules engine 178, which may load rulesets from the rules database 180 and execute the rules; sending notifications, injecting the message, and/or creating blacklisting entries as specified by the rulesets.

Example Computing Environment

Turning to FIG. 4, an example computing environment 200 for implementing the environment depicted in FIG. 1, FIG. 2, and FIG. 3; according to some embodiments. Computing environment 200 includes a plurality of servers 202-1 through 202-n. Servers 202-1 are communicatively coupled via a computer network 204. Each of the servers 202-1 through 202-n may be remote from one another. The network 204 may include any suitable combination of wired and/or wireless communication networks, such as one or more local area networks (LANs), metropolitan area networks (MANs), and/or wide area network (WANs). As just one specific example, the network 204 may include a cellular network, the Internet, and a server-side LAN. As another example, the network 204 may support a cellular (e.g., 4G) connection to a mobile computing device of a user and an IEEE 802.11 connection to the mobile computing device. While referred to herein as a "server," any/all of the servers 202-1 through 202-n may, in some implementations, include multiple servers and/or other computing devices. Moreover, the servers 202-1 through 202-n may include multiple servers and/or other computing devices distributed over a large geographic area (e.g., including devices at one or more data centers), and any of the operations, computations, etc., described below may be performed by remote computing devices in a distributed manner.

Each server 202-1 through 202-n may include a processor 210, a memory 212, a network interface controller (NIC) 214, an input/output (I/O) controller 216, and one or more databases 240. The processor 210 may be a single processor (e.g., a central processing unit (CPU)), or may include a set of processors (e.g., a CPU and a graphics processing unit (GPU)).

The memory 212 may be a computer-readable, non-transitory storage unit or device, or collection of units/devices, that includes persistent (e.g., hard disk) and/or non-persistent memory components.

The memory 212 may store instructions that are executable on the processor 210 to perform various operations, including the instructions of various software applications and data generated and/or used by such applications. In the example implementation of FIG. 1, the memory 212 may store, for example, the trigger detection module 132, the domain validation module 142, etc. As noted above, the components of the environment 100 may be implemented using multiple servers. Therefore, any one (or more) of the modules depicted in FIG. 1 may be arranged in the memory 212 of any of the servers 202-1 through 202-n. For example, in an embodiment, the external services 102 may be implemented in server 202-1. The SMTP server 110 may be implemented in server 202-2. The email listener 120, message queue 122, and email queue listener 130 may be, respectively, implemented in server 202-3, server 202-4, and server 202-5. The particular arrangement of components to the servers 202-1 through 202-n is driven by the resource needs of the individual components.

Generally, the modules in the memory 212 may be implemented using one of a number of resources. For example, the message queue 122 may be implemented as a queue 220. The results module 136 (and other modules) may be implemented as a module 222. The API 106, the SMTP server 110, and the rules engine 178 may be implemented as a service 224.

The processor 210 of each of the servers 202-1 through 202-n may execute the instructions stored in the memory 212 to create and use the resources. For example, the processor 210 may execute a queue class in the memory 212 to instantiate and use the queue 220 in implementing the message queue 122.

Access to each of the databases (e.g., the message store 150, the results store 152, the ML store 154, the domain store 156, etc.) may be facilitated by an Object-Relational Mapper (ORM) 226. A copy of the ORM 226 may be stored in each of the servers 202-1 through 202-n, allowing each server to conveniently access the database 240 using identical binding code. The database 240 may be any suitable database (e.g., a structured query language (SQL) database, a flat file database, a key/value data store, etc.). The database 240 may include a plurality of database tables for storing data according to data storage schema. The database 240 may include relational linkages between tables, and may allow complex data types such as time series data to be stored and queried.

In some embodiments, servers 202-1 through 202-n may be implemented as virtual servers (e.g., cloud-based virtual machines). In that case, logical components may be migrated without the need to touch any hardware. For example, a message queue residing in the server 202-(n-5) may be cloned to create a server 202-(n-4). The ability to provision virtual servers advantageously provides a great deal of flexibility to the possible configurations of the computing environment 100. Moreover, by separating the components, portions of the environment 100 (e.g., the machine learning module 140 and/or the domain validation module 142) may be refactored to be used in conjunction with other systems. For example, one or more of the components may be used as a front-end to another application/system (e.g., a human resources day off request system, other information technology systems, order list requesting systems, Private Branch Exchange (PBX) systems, etc.).

The NIC 214 includes hardware, firmware and/or software configured to enable each of the servers 202-1 through 202-n to exchange electronic data with the other servers 202-1 through 202-n via the network 204. For example, the NIC 214 may include a wired transceiver, a cellular communication transceiver, a WiFi transceiver, and/or transceivers for one or more other wireless communication technologies (e.g., 4G).

The I/O controller 216 includes hardware, firmware and/or software configured to enable a user to interact with (i.e., both provide inputs to and perceive outputs of) the servers 202-1 through 202-n. For example, the I/O controller 216 may be coupled to a touchscreen with both display and manual input capabilities. Alternatively, or in addition, the I/O controller 216 may be coupled to a keyboard for accepting user inputs, and/or a microphone (with associated processing components) that provides voice control/input capabilities to the user. In some embodiments, the servers 202-1 through 202-n may include multiple different implementations of the I/O controller 216. The I/O controller 216 may allow a user to perform maintenance functions, such as loading modules into the memory 212.

Example Method

Figure 5:
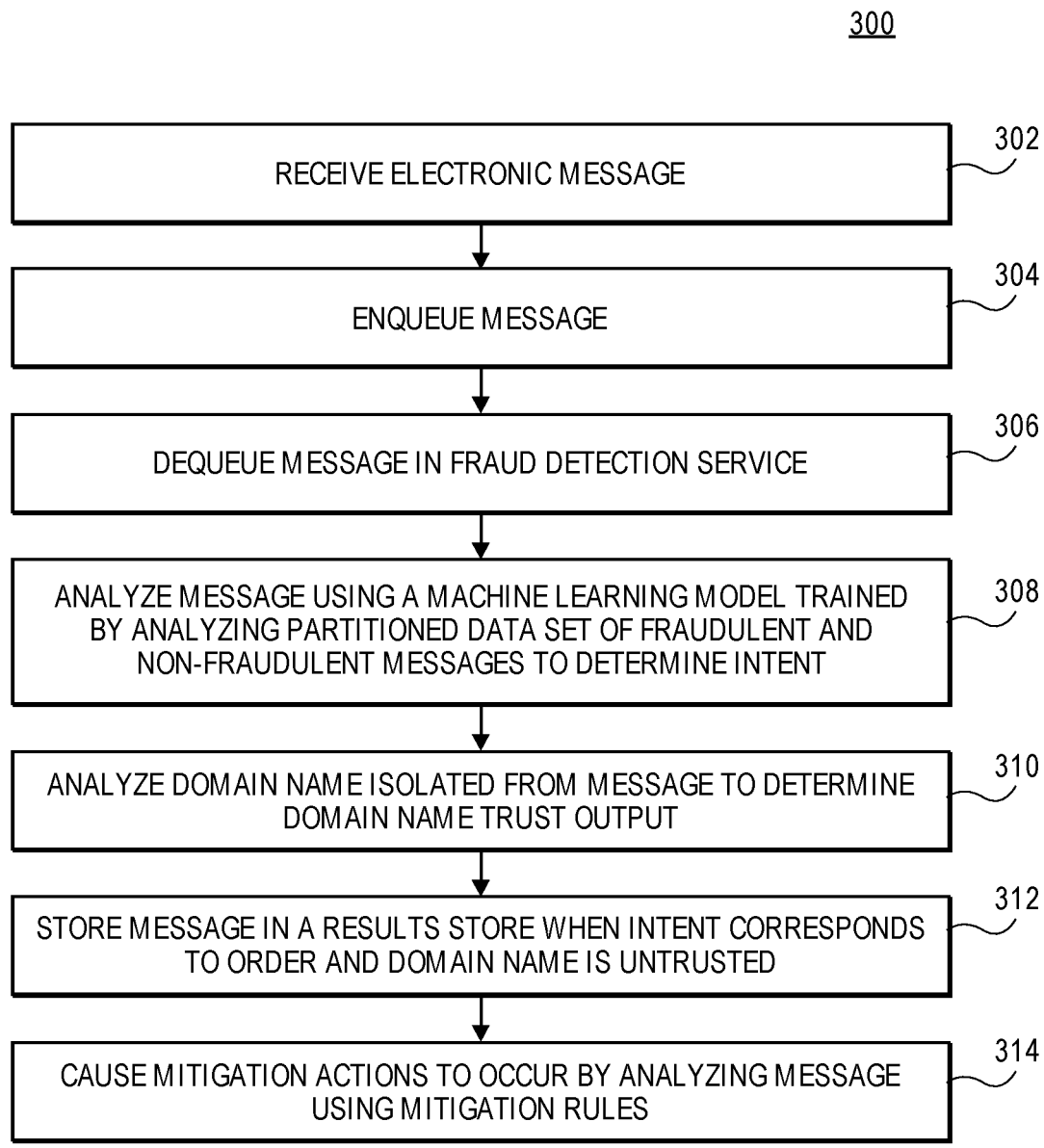
FIG. 5 depicts an example method of using machine learning to detect and mitigate message-based attacks, according to an embodiment.

FIG. 5 depicts an example method 300 of using machine learning to detect and mitigate message-based attacks, according to an embodiment. The method 300 may include receiving an electronic message (block 302). As noted, the message may be an email, a text message, an electronic form submission, a chat message, etc. In some embodiments, the message may be received from an SMTP server. In other embodiments, the message may be received via an electronic form submission, via a text message or SMS gateway, via a web chat interface, etc. The message may be encoded in a standard format, such as an HTTP POST payload, an .eml file, a plain text email, a MIME-encoded email, a multipart email, etc. In some embodiments, the message may be encoded in a proprietary or customized data format. Receiving the message may include receiving the message via an SMTP dialog, including HELO, MAIL FROM, and RCPT TO commands.

The method 300 may include enqueueing the message in a message queue (block 304). In some embodiments, the SMTP server 110 or another message receiving service may write the message directly to a message queue, using (for example) a customized service and/or content filter. The content filter may include computer-executable instructions for processing the message. In some embodiments, an email listener such as email listener 120 may be implemented as a Microsoft Windows service, and may filter the message according to junk/non-junk categories. In some cases, further filtering may be performed, such as discarding messages that are not addressed to AMs. The method 300 may include querying a Lightweight Directory Access Protocol (LDAP) or Active Directory service to determine whether a message is directed to an AM, or not. Of course, although a singular "message" is referred to in the context of the above example, it should be appreciated that modern mail servers are multi-threaded and can handle the delivery of many thousands of message per second, or more. Therefore, the method 300 may support the parallel processing of one or more message, in embodiments.

The method 300 may include a fraud detection service dequeueing the message (block 306). In particular, an email queue listener that may correspond to the email listener 120 of FIG. 1 may dequeue messages as they arrive in the queue and/or on a periodic basis and then direct the messages toward the message analysis API 106 of FIG. 1 for further processing.

The method 300 may include the fraud detection service analyzing the message using a machine learning model trained by analyzing a partitioned data set of fraudulent and non-fraudulent messages to determine an intent (block 308). Determining an intent may include determining one or more intents (e.g., Quote, Order, Tracking Number, etc.). For example, a message may include language that the ML module 140 of FIG. 1 has never seen before; however due to the general training on the partitioned data set, the ML module 140 is able to accurately determine the intent of the sender of the message. This ability of the ML model to determine an intent without having previously seen the exact message being analyzed is an advantageous aspect of using ML techniques for intent determination instead of the more rigid approaches seen in prior techniques. At the same time the fraud detection service analyzes the message using the machine learning model, or in response to such analysis indicating a particular intent (e.g., Order), the fraud detection service may analyze the domain name of the sender of the message. It should be appreciated that many other intents are envisioned, beyond Quotes and Orders. In particular, the present techniques may be generalized to detect and mitigate fraud in any type of business transactions including written communication, in other markets. Similarly, in some embodiments, the company may package and sell the entire environment 100 to a third-party for use in their business.

Specifically, the method 300 may include the fraud detection service analyzing a domain name isolated from the message to generate a domain name trust output (block 310). As discussed, isolating the domain name from the message may include executing an algorithm for determining the best or most likely to be accurate sending address from multiple sending addresses. In general, the sender of an email may include any headers that the sender wants, including multiple headers indicating multiple (possibly different) sending email addresses. Therefore, the ability of the method 300 to determine the best sending address is advantageous. In particular, examining SPF and DomainKeys Identified Mail (DKIM) signatures in mail headers helps to prevent senders from spoofing the sending address of an email message. Analyzing the domain name isolated from the message to generate a domain name trust output may include comparing the domain name to a pre-determined list of domain names (i.e., a whitelist of known domains) to determine whether the isolated domain is a known value. When the isolated domain is not a known value, and the intent is of a predetermined type (e.g., Order) the fraud detection service 124 may store the message for further analysis. In some cases, as discussed, the textual similarity/distance of the isolated domain to existing whitelisted domains may be determined to check for the possibility of domain impersonation attacks.

In particular, the method 300 may include the results module 136 storing the message in a results store when the intent is an order and the domain name status is untrusted (block 312). The message may be stored as a text blob, or written to a queue or filesystem, wherein a reference to the queue object identifier or filesystem path is stored in the database. That is, some embodiments may include a hybrid of storing metadata in the results store 152 and messages on a filesystem (e.g., a distributed filesystem, a cloud object store, etc.).

The method 300 may include causing one or more mitigation steps to occur by analyzing the message using one or more mitigation rules (block 314). The mitigation rules may be authored by a business team and may allow business logic to be layered over the top of the fraud detection and mitigation methods and systems. In particular, the mitigation rules allow lightweight scripts to be written which have access to context values regarding aspects of the message (e.g., a list of part numbers in the message, a list of quantities of the respective part numbers, a total dollar amount of a requested order, etc.) and the isolated domain (e.g., the age of the domain, registrar information, etc.). The mitigation rules also include the ability to call functions corresponding to submodules of the mitigation module 108, permitting the user to condition notifications, message injection, and blacklisting on the context values.

The wall-clock time/elapsed real time for a message to be fully processed by the present techniques, from the time the message is delivered to the SMTP server 110 until it is analyzed by the rule sets of the mitigation module 108, may be as little as one half second or less. Therefore, the present techniques greatly assist the company to proactively identify and mitigate fraudulent as it is occurring, while also reducing the overall computational resources necessary to do so. In some embodiments, the mitigation rules sets may be implemented such that the mitigation module 108 executes the rule sets during other application contexts. For example, the mitigation module 108 may pre-compute the rule sets, or execute the rule sets during an entry process of an application. Tradeoffs relating to computational resources may exist among different implementations.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of detecting and mitigating message-based attacks, the method comprising:
   receiving, via a computer network, an electronic message;
   enqueueing, via a listener, the message in a message queue;
   dequeueing the message from the message queue by a fraud detection service;
   training a machine learning model to classify a message intent by analyzing a partitioned data set of fraudulent and non-fraudulent messages, wherein the training includes excluding personal messages,
   analyzing the message using the trained machine learning model to determine the message intent;
   analyzing a domain name isolated from the message to determine a domain name trust output;
   storing, when the message intent corresponds to an order and the domain name trust output is untrusted, the message in a results store; and
   causing one or more mitigation actions to occur by analyzing the message using one or more mitigation rules.

2. The method of claim 1, wherein the electronic message is an email.

3. The method of claim 1, wherein analyzing the message using the machine learning model trained by analyzing the partitioned data set of fraudulent and non-fraudulent messages to generate the message intent includes training the machine learning model to perform a logistic regression.

4. The method of claim 1, wherein analyzing the domain name isolated from the message to determine the domain name trust output includes querying one or both of (1) a public WHOIS server, and (2) a private WHOIS server.

5. The method of claim 1, wherein analyzing the domain name isolated from the message to determine the domain name trust output includes determining whether the domain name isolated from the message is a known value.

6. The method of claim 1, wherein analyzing the domain name isolated from the message to generate the domain name trust output includes determining a weighted score corresponding to a net domain name trust output.

7. The method of claim 1, wherein causing the one or more mitigation actions to occur by analyzing the message using the one or more mitigation rules includes executing a set of rules.

8. The method of claim 7, further comprising:
generating, based on executing the set of rules, a notification.

9. The method of claim 7, further comprising:
injecting, based on executing the set of rules, information into the message.

10. The method of claim 7, further comprising:
storing, based on executing the set of rules, identifying information in the message in a blacklist database.

11. A computing system for detecting and mitigating message-based attacks includes: a transceiver; one or more processors; and one or more memories storing instructions that, when executed by the one or more processors, cause the computing system to:
receive, via the transceiver, an electronic message;
enqueue the message via a listener in a message queue;
dequeue the message from the message queue by a fraud detection service;
train a machine learning model to classify a message intent by analyzing a partitioned data set of fraudulent and non-fraudulent messages, wherein the training includes excluding personal messages,
analyze the message using the trained machine learning model to determine the message intent;
analyze a domain name isolated from the message to determine a domain name trust output;
store, when the message intent corresponds to an order and the domain name trust output is untrusted, the message in a results store; and
cause one or more mitigation actions to occur by analyzing the message using one or more mitigation rules.

12. The computing system of claim 11, wherein the electronic message is an email.

13. The computing system of claim 11, the one or more memories storing further instructions that, when executed by the one or more processors, cause the computing system to:
train the machine learning model to perform a logistic regression.

14. The computing system of claim 11, the one or more memories storing further instructions that, when executed by the one or more processors, cause the computing system to:
query one or both of (1) a public WHOIS server, and (2) a private WHOIS server.

15. The computing system of claim 11, the one or more memories storing further instructions that, when executed by the one or more processors, cause the computing system to:
determine whether the domain name isolated from the message is a known value.

16. The computing system of claim 11, the one or more memories storing further instructions that, when executed by the one or more processors, cause the computing system to:
determine a weighted score corresponding to a net domain name trust output.

17. The computing system of claim 11, the one or more memories storing further instructions that, when executed by the one or more processors, cause the computing system to:
execute a set of rules causing a notification to be generated.

18. A non-transitory computer readable medium containing program instructions that when executed, cause a computer to:
receive, via a computer network, an electronic message;
enqueue the message via a listener in a message queue;
dequeue the message from the message queue by a fraud detection service;
train a machine learning model to classify a message intent by analyzing a partitioned data set of fraudulent and non-fraudulent messages, wherein the training includes excluding personal messages,
analyze the message using the trained machine learning model to determine the message intent;
analyze a domain name isolated from the message to determine a domain name trust output;
store, when the message intent corresponds to an order and the domain name trust output is untrusted, the message in a results store; and
cause one or more mitigation actions to occur by analyzing the message using one or more mitigation rules.

19. The non-transitory computer readable medium of claim 18 containing further program instructions that when executed, cause a computer to:
train the machine learning model to perform a logistic regression.

20. The non-transitory computer readable medium of claim 18 containing further program instructions that when executed, cause a computer to:
determine whether the domain name isolated from the message is a known value.

* * * * *